Oct. 18, 1932.  J. O. GOODWIN  1,883,704
BALL COVERING PROCESS
Filed Feb. 5, 1931
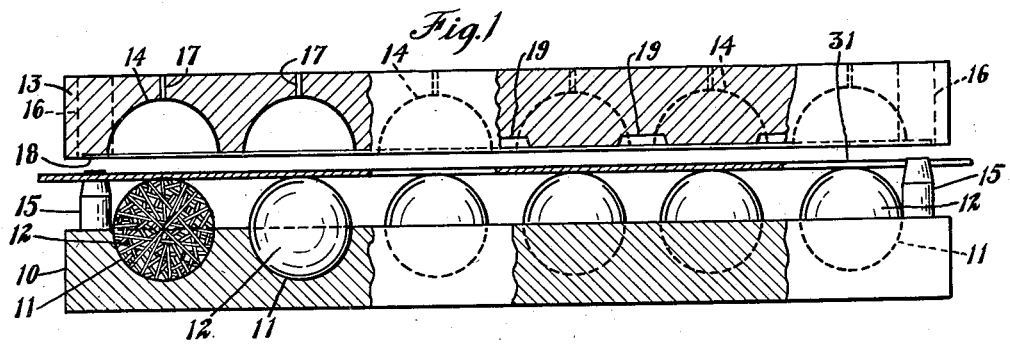
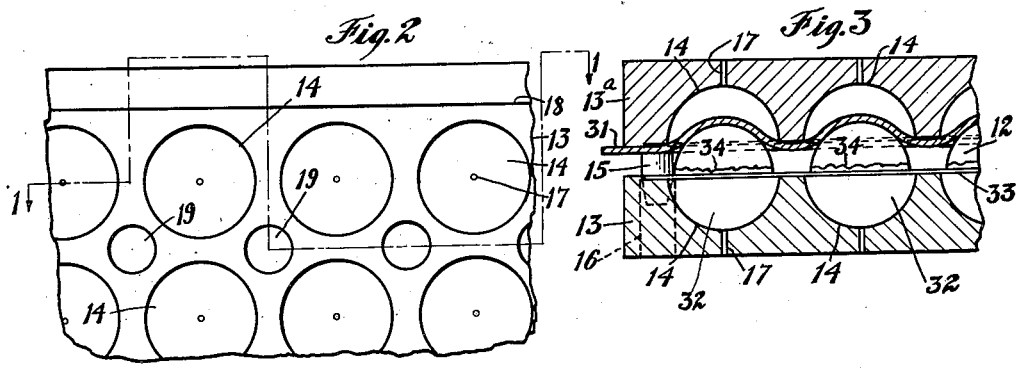
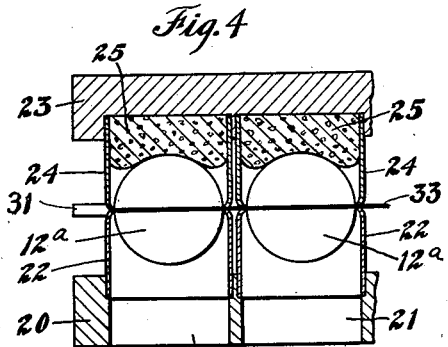
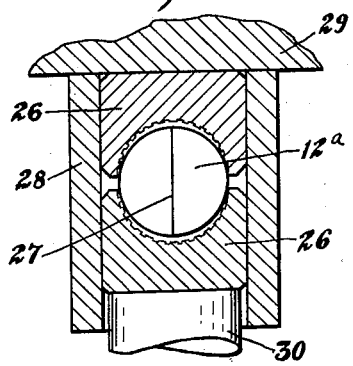
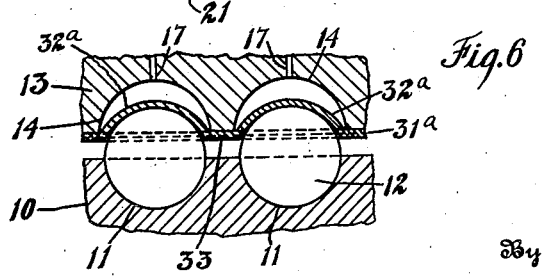
Inventor
J. O. Goodwin,
By Robert M. Pierson,
Attorney Patented Oct. 18, 1932

1,883,704

UNITED STATES PATENT OFFICE

JOHN O. GOODWIN, OF AKRON, OHIO, ASSIGNOR TO SEIBERLING LATEX PRODUCTS COMPANY, OF BARBERTON, OHIO, A CORPORATION OF OHIO

BALL COVERING PROCESS

Application filed February 5, 1931. Serial No. 513,549.

This invention relates to the art of applying covering material in sheet form and in a plastic condition to an article or body to be covered thereby, as instanced by balls of various kinds, including golf balls, a baseball center including a small cork sphere covered with soft rubber, a billiard ball comprising a heavy core covered with casein or other composition, a bowling ball having an inner core of cheap material and successive outer layers of hard rubber composition of different grades, metallic and other cores to be covered with bakelite or the like, etc.

My general objects are to effect a saving in the consumption of time, labor and material, and to attain a more uniform product. Uniformity of cover thickness and accurate centralization of cores are often important and difficult to attain in plastic-covered balls as well as other articles completely enclosed in a covering envelope, but are effectively accomplished by this invention as applied to the covering of a plurality of articles at the same time.

My invention is in part an improvement upon the method of covering articles, especially golf ball centers, described in my prior application Ser. No. 477,050, filed Aug. 22, 1930, wherein a half cover of plastic material such as balata composition is molded upon one side of the ball center while the latter is maintained by a suitable holder in an accurately centered position with respect to the molding cavity, and the process is then repeated to apply the other half cover upon the opposite side of the ball. According to my present invention in its preferred embodiment, the covering of a multiplicity of the article with a common sheet or sheets of covering material and the separation of the covered articles from the connecting portions of the sheet or sheets are performed as a separate step or series of steps in advance of the final molding operation. The latter in the case of a golf ball includes the impressing of the cover with a mesh or dimple marking or other configuration, and this final molding may be performed without creating any substantial overflow or extrusion of cover material from the mold. The invention may be used to great advantage with vulcanizable air-curing stocks containing rapid accelerators, since there is no preforming of and storing of individual cover halves involved, and the trimmings or scrap may be thrown back and reworked in the mill with practically no waste.

Of the accompanying drawing, Fig. 1 is a side elevation, partly in section, illustrating a molding apparatus and material assembled for the performance of the first half of a golf-ball covering operation in accordance with my invention, the section being taken on the line 1—1 of Fig. 2.

Fig. 2 is a reverse plan view showing a portion of the upper half of the multiple-cavity mold.

Fig. 3 is a partial vertical section illustrating the process of covering the second half of the ball bodies.

Fig. 4 is a vertical section of trimming apparatus illustrating the operation of pinching off the covered balls from the connecting portions of their covering sheets.

Fig. 5 is a vertical section illustrating the performance of the final molding step.

Fig. 6 is a detail sectional view illustrating a modification.

In the drawing, 10 is the lower plate of a multiple-cavity ball-covering apparatus formed with a series of hemispherical cavities 11, the walls of which act as sockets or holders exactly fitting and frictionally gripping the lower portions of the articles to be covered, which in the case of golf balls are the usual rubber thread-wound centers, cores or inner ball bodies 12 of which the one at the left in Fig. 2 is illustrated with its thread windings, the others being shown in outline.

13 is an upper plate or covering mold formed with a series of hemispherical cavities 14 of a radius exceeding that of the cavities 11 in the plate 10 by an amount equal to the desired thickness of the half cover to be formed on the ball, and adapted to be accurately centralized or registered coaxially with said cavities 11 by means of dowel pins 15 on the plate 10 and dowel-receiving holes 16 in the plate 13. The cavities 14 are provided with vent holes 17 for the escape of air from between the mold and the cover stock, and the lower face of plate 13 is formed with a shallow recess or countersink 18 for the reception of the web or portion of the sheet cover stock which surrounds and connects the half-covered ball bodies. Said lower face is further formed with overflow recesses 19 in the areas between the molding cavities 14 for the reception of excess cover stock which may be squeezed out from between said molding plate and the ball bodies.

While the opposite halves of the ball bodies might be covered in some other way, I prefer to cover them in like fashion and to this end provide a second mold plate 13ª (Fig. 3) formed with hemispherical molding cavities 14 of the same size as those in the plate 13 and adapted to be accurately registered therewith by dowel pins 15 on said plate 13ª entering the holes 16 in the opposite plate.

For pinching or trimming off the covered balls 12ª from their connecting web of cover stock, I provide an apparatus illustrated in Fig. 4 and consisting of a lower plate 20 formed with vertical through apertures or ball passages 21 and with upwardly projecting, annular, metallic cutting tubes 22 having inwardly-turned circular cutting edges, and an upper plate 23 having similar downwardly-projecting cutting tubes 24 and yielding ejector disks 25 which may be formed of sponge rubber located within the upper portions of said tubes 24 for forcing the trimmed balls downwardly through the tubes 22. The cutting edges of these tubes might be either plain or scalloped with interfitting teeth in accordance with a known practice in making annular butt-joints between plastic members.

In some cases the process may end with the separation of the covered articles from their connecting web, but with golf balls I find certain advantages in applying smooth covers and cutting off the web substantially as described, and then molding the covers with the desired marking in a final stage. In Fig. 5 I have illustrated a final molding apparatus comprising hardened steel mold halves or dies 26 of the conventional type adapted to receive the trimmed covered ball 12ª, preferably with its cover seam or equator 27 placed vertically or transversely of the dividing plane of said mold halves, the latter having their cavities engraved to provide the desired roughened configuration to the ball surface, together with a guiding sleeve 28 for said mold halves, a laterally-shiftable upper press platen 29 and a vertically-movable lower press platen or plunger 30, this molding unit being suitably repeated in a gang apparatus to operate with individual molding pressure upon a multiplicity of balls at the same time.

In the performance of my complete method with the several above-described devices, the holder plate 10 shown in Fig. 1 is filled to its capacity with ball bodies or centers 12 fitted in the sockets 11, said plate is placed upon the lower platen of a press which may be kept in a cool condition by circulating cold water therethrough, a warmed sheet 31 of the cover stock, which may be balata composition, or a suitable mixture of balata with rubber and vulcanizing and accelerating ingredients for a vulcanizable cover, is applied, the upper plate 13 is placed over said cover sheet 31 and its cavities 14 aligned with the cavities 11 of the lower plate as shown in Fig. 1, and said upper plate is pressed down against the lower plate and the intervening work by its weight and the pressure of the upper press platen which is kept hot by circulation of steam therethrough. Those portions of the cover sheet 31 which overlie the ball centers 12 are shaped upon said centers by the depression of their marginal portions surrounding each of said centers and the progressive stretching, wrapping and molding of the stock thereon until the plates come together. Thus the ball centers are provided with individual half covers 32 (Fig. 3) surrounded and connected by a continuous web 33 of the cover stock.

Because of the application of the cover stock in continuous sheet form concurrently to a multiplicity of the ball bodies there is a minimum of flow of the stock across the ball surfaces, and the progressive application of the stock avoids any substantial entrapment of air between the ball bodies and their covers. The plastic flow of the stock under the influence of the heat and pressure causes it to become thoroughly interlocked with the thread surfaces of the centers 12, and the half covers are formed of substantially uniform thickness because of their being held central with the molding cavities 14 by means of the holding sockets 11. The connecting web of stock is forced into the countersunk recess 18 of the upper plate, and any excess finds its way by lateral and vertical flow into the overflow pockets or recesses 19. A small amount of the cover material is extruded into the sockets 11 upon the opposite half of each of the ball centers 12 as an overflow 34 shown in Fig. 3, which aids in forming a lap seam with the remaining cover half when the latter is applied, for supplementing the main butt seam between the halves. While the plates 10 and 13 are held together by the press pressure, cold water is circulated in the upper press platen and the lower platen is also maintained in cold condition, to chill and thereby harden the half covers and the intervening web.

When the plates and their contents are sufficiently cool, the holder plate 10 is stripped off, leaving the ball centers 12 and their half covers and the connecting web upon, and in the cavities of, the upper plate 13. Said plate 13 is then inverted as shown in Fig. 3, another sheet 31 of cover stock is placed over the bare upper halves of the ball centers, a plate 13ª having mold cavities which are duplicates of those in the plate 13 is placed over the latter and the intervening materials, and the described covering operation is repeated on the upper halves of the ball. During this step, the upper press platen is heated by steam circulation, and the lower platen may be kept in either a cool or warm condition as required or permitted for the proper welding of the cover seams. When this second half covering step is completed, the mold plates are again cooled to harden the stock, after which the covered balls with their connecting web are stripped from both mold plates.

The covered balls 12ª are next pinched off or trimmed from their connecting web, preferably by means of the gang trimming apparatus illustrated in Fig. 4, through the coming together of the edges of the lower and upper cutting tubes 22, 24, and the trimmed balls, with the aid of the sponge rubber ejector pads or disks 25, may be caused to fall through the apertures 21 into a suitable receptacle. The trimmings or excess of cover stock may be immediately returned to the sheeting mill or calender for reworking.

While the severing of the covered balls from their connecting web of cover stock is not necessarily reserved for a separate operation following the application of the second half covers, as described, there is an advantage in leaving said web attached to the balls until they are stripped from the molds, in that the presence of said web greatly facilitates this stripping operation, and the entire group of balls can then be handled as a unit and quickly placed in proper registry with the cutters of a trimming apparatus such as just described.

Each ball body will now have thereon an accurately centered, smooth cover of substantially uniform thickness throughout and of an exactly predetermined external diameter, the cover being amalgamated or interlocked with the ball center and its seam edges thoroughly welded together because of the relatively high molding heat—approximately 220° F.—employed during the covering process to produce a highly plastic condition of the cover stock.

This covered and trimmed ball may then be placed in a cold condition in a final molding apparatus of the usual or any suitable type such as the type illustrated in Fig. 5, including dies or mold halves 26 having cavities engraved to impart the desired configuration or markings upon the ball cover and of a combined size practically equal to that of the ball. Said mold halves are placed in a sleeve 28, closed above by a removable slide or platen 29, and are immediately brought tightly together by pressure furnished by a plunger 30, so that the ball cover surface will be indented by the projections or embossing on the walls of the mold cavities. The ball cover is then permanently impressed with the reverse of the pattern formed on the mold members 26, through the softening of said cover by heat applied through the sleeve 28 in any suitable manner, at a somewhat lower temperature—in the neighborhood of 150° F.—than that employed for the covering operation, since the cover stock need be only plastic enough in this final molding to take a sharp impression of the mold pattern, and by having the stock less flowable the final molding can take place without any substantial or with the minimum possible amount of extrusion of cover material from between the mold halves.

In this final molding I prefer to place the cover seam 27 vertically or transversely and substantially at right-angles to the meeting plane of the mold halves 26 in order that any protruding seam rib may be obliterated. The final molding, particularly when the ball is placed as described, tends to relieve any strains left in the cover during the first molding and to equalize any slight oblateness of the ball center 12 which may have been imposed by the exertion of vertical pressure in the position occupied by said center during the application of the two half covers by the steps illustrated in Figs. 1 and 3. On the completion of this final molding step and cooling of the balls while under pressure in the apparatus of Fig. 5, said balls are removed, the flash, if any, rubbed, brushed or otherwise trimmed off and the balls preferably allowed to season for several days, during which the hardness of the cover will increase if the latter is of air-curing stock, after which the balls may be painted.

While I have particularly described a preferred mode of carrying out my invention, it will be understood that the form of practicing the same may be varied and modifications introduced without departing from the scope of the invention as defined in the claims. For example, Fig. 6 represents a modification in which, instead of placing a flat sheet of cover stock over the ball bodies as represented in Fig. 1 and shaping it solely by forming it upon said bodies as indicated in Fig. 3, I provide a cover sheet 31ª which has been partially preshaped between male and female molds or dies to form cup-shaped portions 32ª therein, preferably on a radius slightly greater than that of the ball centers to avoid trapping of air between cover and center, said portions having the same spacing as the mold cavities and sockets. This expedient, which may be used on either or both sides of the balls, still further minimizes the flow of stock during the covering operation, and it predetermines the sheet thickness so that the cover sheet blank need not be so accurately calendered.

Heat-plastic cover stocks other than balata mixtures, and also stocks rendered plastic or dough-like by the use of a solvent and adapted to be hardened by drying after the cover is applied may be employed, and the materials and procedure varied in accordance with the nature of the article and the effect desired.

In applying a soft-rubber cover to a ball body or other article by means of this method, the first half-cover, compounded for vulcanization, may be applied and semi-cured to harden it, after which the second half-cover, which may be compounded to vulcanize in a shorter time, is then applied and the two half-covers vulcanized together. For large hard balls, including those employed in bowling, successive layers of hard-rubber composition may be applied to a cheap core substantially in the manner indicated, and the constituent half-covers of each layer may be semi-vulcanized before the next layer is applied and the entire ball then given a final cure, the layers or the half-covers being differentially compounded to vulcanize at different rates or not according to what degree of uniformity of hardness may be desired in the several layers.

I claim:

The method of covering ball bodies which comprises building up successive layers of rubber composition on the ball body, one side at a time, while holding the ball by its opposite side, semi-vulcanizing the components of the inner layer or layers before applying the outer layer or layers, and finally vulcanizing all the layers.

In witness whereof I have hereunto set my hand this 3rd day of February, 1931.

JOHN O. GOODWIN.